(12) United States Patent
Vervilos

(10) Patent No.: US 11,992,000 B1
(45) Date of Patent: May 28, 2024

(54) MOUSETRAP WITH TILTING PLATFORM

(71) Applicant: Demetrios Constantinos Vervilos, Carmichael, CA (US)

(72) Inventor: Demetrios Constantinos Vervilos, Carmichael, CA (US)

( * ) Notice: Subject to any disclaimer, the term of this patent is extended or adjusted under 35 U.S.C. 154(b) by 0 days.

(21) Appl. No.: 18/366,032

(22) Filed: Aug. 7, 2023

(51) Int. Cl.
*A01M 23/30* (2006.01)

(52) U.S. Cl.
CPC .................................. *A01M 23/30* (2013.01)

(58) Field of Classification Search
CPC ...... A01M 23/30; A01M 23/00; A01M 23/02; A01M 23/04; A01M 23/06; A01M 23/24; A01M 23/245; A01M 23/26; A01M 23/265; A01M 23/28
USPC ............................................................ 43/81
See application file for complete search history.

(56) References Cited

U.S. PATENT DOCUMENTS

| | | | | |
|---|---|---|---|---|
| 553,372 A * | 1/1896 | Waldurff | .............. | A01M 23/30 43/81 |
| 645,589 A * | 3/1900 | Erickson | .............. | A01M 23/30 43/83 |
| 717,002 A * | 12/1902 | Hooker | .............. | A01M 23/30 43/83 |
| 722,842 A * | 3/1903 | Hooker | .............. | A01M 23/30 43/83 |
| 744,343 A * | 11/1903 | Hooker | .............. | A01M 23/30 43/81 |
| 793,349 A * | 6/1905 | Chasse | .............. | A01M 23/30 43/81 |
| 1,284,483 A * | 11/1918 | Slepicka | .............. | A01M 23/30 43/81 |
| 1,967,629 A * | 7/1934 | Ruby | .............. | A01M 23/30 43/81 |
| 2,002,095 A * | 5/1935 | McCabe | .............. | A01M 23/30 43/81 |
| 2,144,956 A * | 1/1939 | Arndt | .............. | A01M 23/30 43/81 |
| 2,187,001 A * | 1/1940 | Uttz, Sr. | .............. | A01M 23/30 43/83.5 |
| 2,263,161 A * | 11/1941 | Brust | .............. | A01M 23/30 43/81 |
| 2,544,295 A * | 3/1951 | Brust | .............. | A01M 23/30 43/81 |
| 2,598,205 A * | 5/1952 | Altham | .............. | A01M 23/30 43/81 |
| 4,363,183 A * | 12/1982 | Drdlik | .............. | A01M 23/30 43/81 |
| 4,517,557 A * | 5/1985 | Agron | .............. | G08B 21/18 43/81 |
| 4,578,892 A * | 4/1986 | Melton | .............. | A01M 23/18 43/60 |

(Continued)

*Primary Examiner* — Joshua E Rodden

(57) ABSTRACT

The improvement to the prior art mousetrap is the creation of a wedge cut from at or near the spring to the end of the mousetrap. The wedge length is from around the mid-point of the coiled spring to the end of the platform (the tapering occurs on the side of the bait portion of the trap). This tapering of the platform creates an unstable, tilting platform and as soon as the mouse steps onto it that increases the sensitivity of triggering the release of the striker, catching the mouse. The mouse could stand anywhere on the tapered platform, springing the trap and capturing the mouse on the platform, whether or not the mouse is close to the bait.

5 Claims, 2 Drawing Sheets

(56) References Cited

U.S. PATENT DOCUMENTS

| | | | | |
|---|---|---|---|---|
| 5,720,125 A | * | 2/1998 | Oviatt | A01M 23/20 |
| | | | | 43/61 |
| 7,458,182 B2 | * | 12/2008 | Johnson | A01M 23/18 |
| | | | | 43/67 |
| 9,861,091 B2 | * | 1/2018 | Derman | A01M 99/00 |
| 2017/0238525 A1 | * | 8/2017 | Derman | A01M 23/30 |
| 2021/0251210 A1 | * | 8/2021 | Cosentino | A01M 23/245 |

* cited by examiner

MOUSETRAP WITH TILTING PLATFORM

FIELD

This invention relates to mouse, rat and other vermin traps. More particularly, this invention relates to mousetraps having a flat base/platform (herein identified as "platform" or "base" by itself or in combination as "base/platform"), a spring-loaded striker held back by a latch that is released when the animal depresses the trigger.

BACKGROUND

Mousetraps are widely used to capture and kill mice. The most common type of mousetrap contains a spring-loaded striker held back by a latch that is released upon the mouse reaching the bait. There are various sizes of these mousetraps that can be used for rats and other, larger vermin. The term "mousetrap" is used herein for all sizes of spring-loaded animal traps.

The spring-loaded striker mousetrap requires that the mouse reach and take the bait before the striker is released, catching the mouse. This requirement allows the mouse the opportunity to steal the bait out of the trap without being caught.

The basic design of the mousetrap has remained unchanged for a long time, ensuring a consistent triggering of the trap, however this basic design has a problem. If the bait is not set properly, the mouse can remove the bait without triggering the trap. If the triggering mechanism is delayed for any reason, the trigger may not kill the mouse; instead, it may catch the mouse by its body, tail or foot, thereby causing the mouse suffering, as well as distress to the person who then has to either release the mouse or use another means to end the suffering of the mouse.

The current design of the mousetrap is a flat wooden base that is relatively flush with the ground. The flat base of the existing mousetrap provides a stable surface in which the mouse may be on without triggering the trap. In other words, the mouse may stand on the trap and may not trigger the trap unless and until the mouse attempts to remove the bait.

Accordingly, there is a demand for an improved mousetrap. More particularly, there is a demand for a mousetrap that has an uneven platform that will trigger the trap most of the time that the mouse sets foot on any part of the mousetrap that has the uneven base thereby ensuring a more successful catch each time, as well as making sure there is no opportunity for the mouse to remove the bait without triggering the trap.

SUMMARY

The general object of this invention is to provide an improved mousetrap. In particular, the object is to provide a mousetrap that has an increasingly thinner base starting from around the mid-point of the coiled spring to the end of the trap (the tapering occurs on the side of the bait portion of the trap), that will cause the release of the trigger when the mouse steps onto any part of the thinner platform base, rather than only when a mouse attempts to remove the bait. When the mouse steps on any part of the top of the tapered base, the weight of the mouse causes the mousetrap to lurch downward, creating a chain reaction releasing the striker, capturing the mouse.

Another object of the invention is to minimize the possibility of a mouse stealing the bait without springing the trap. Through experience or improper bait setting, a mouse can remove the bait without triggering the mousetrap. However, with the tapered base, the mouse will trigger the striker without having to get close to the bait. So, even if the mouse is experienced or there was improper bait setting, those reasons will no longer stand in the way of capturing the mouse, as the striker is released when the mouse steps anywhere on top of the tapered base.

A feature of this invention is the tapering of the platform from around the mid-point of the coiled spring to the end of the platform (the tapering occurs on the side of the bait portion of the trap). This tapering of the platform creates an unstable, tilting platform as soon as the mouse steps onto it that increases the sensitivity of triggering the release of the striker, catching the mouse. The mouse could stand anywhere on the tapered platform, springing the trap and capturing the mouse on the platform, whether or not the mouse is close to the bait.

I have invented an improved mousetrap. The improvement is a mousetrap that has an increasingly thinner base starting from around the mid-point of the coiled spring to the end of the trap (the tapering occurs on the side of the bait portion of the trap), that causes the release of the trigger when the mouse steps onto the tapered platform rather than only when a mouse attempts to take the bait.

DETAILED DESCRIPTION

Figure 1:
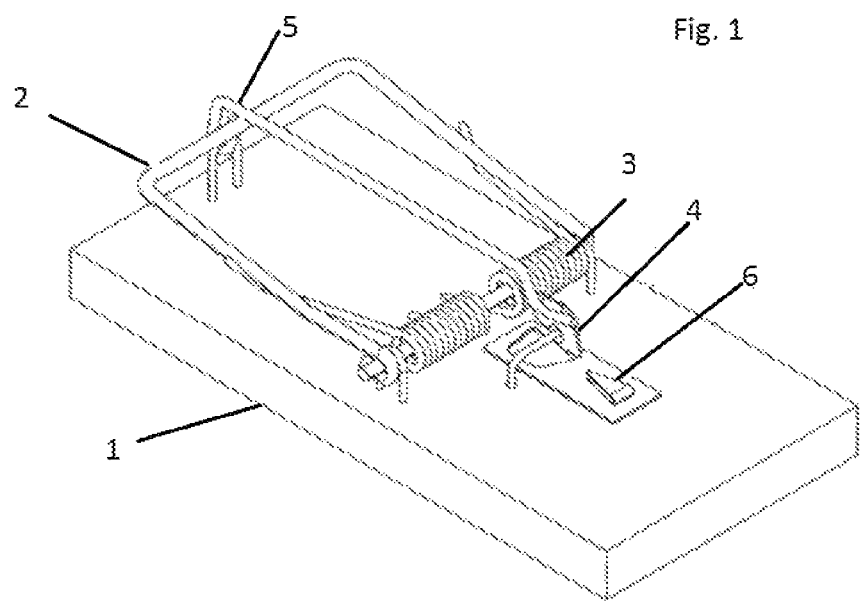
FIG. 1 is a perspective view of a prior art mousetrap in the armed position.

This invention is best understood by reference to the drawings. Referring to FIG. 1, the prior art mousetrap, shows the conventional parts of a standard mousetrap. It has a base or platform (1) ("base/platform" or "base" or "platform"), generally rectangular and made of wood, but could be made of a form of wood, metal, plastic, and/or any other material; a striker (2) with a helical spring (3), generally located transversely on the base/platform. The spring (3) is generally located near the mid-point of the base/platform (1), thereby dividing the base into two near-equal parts; a trigger (4) to hold the bait that attracts the mouse to the mousetrap and secures the striker (2) in the armed position; a latch (5); and a catch (6).

In its prior art form, the mousetrap must attract the mouse to the bait. When the mouse attempts to remove the bait, the trigger (4) will be moved, the latch (5) to be undone, and release the striker (2), capturing the mouse. However, because the mouse can remove the bait without engaging the striker (2), a more sensitive mechanism must be involved to trigger (4) the striker (2) when the mouse steps onto the base/platform (1), not necessarily at the point of the bait.

Figure 2:
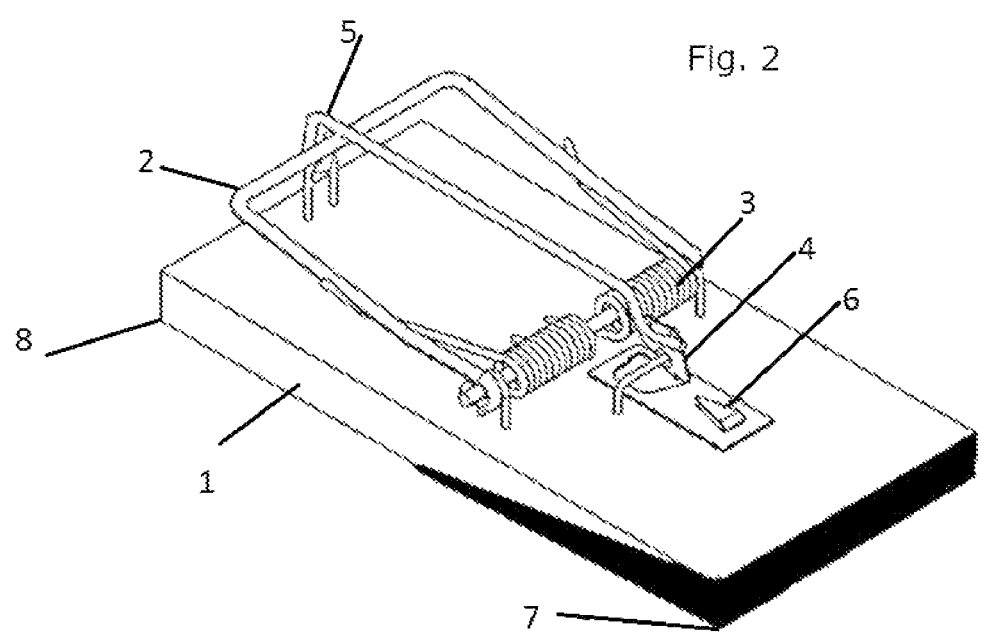
FIG. 2 is a perspective view of the side elevation view thereof showing the tapering of the base/platform (1) from the spring (3) to the end of the base/platform (7). The white shading from the spring (3) to the end of the base/platform (7) depicts the new base/platform while the black shading depicts the part of the base/platform that has been removed; thereby, creating an unstable or tilting base/platform.

Referring to FIG. 2, the base/platform (1), from approximately the mid-point of the coiled spring (3) to the end of the bait side of the base/platform (7), there is a gradual tapering of the base material (from 3 to 7). The portion of the base/platform (1) that is tapered will be at least half or slightly less than half of the entire length of the base/platform (1). The tapering begins from approximately the mid-point of the spring (3) to the end of the bait side part of the base/platform (7). This tapering creates a wedge, thereby enabling the tilting downward of the base/platform upon any kind of pressure upon that part of the base/platform (from 3 to 7). The points between (3) and (7), comprising approximately half of the platform, forms a wedge, which allows that part of the base to tilt or pivot downward upon the mouse stepping on the platform. The white shading from the spring (3) to the end of the base/platform (7) depicts the new base/platform while the black shading depicts the part of the base/platform that has been removed; thereby, creating an unstable or tilting base/platform. The length from (3) to (7) is at least or slightly less than the length from the spring (3) to the end of the striker (2) in the armed position (8). When the mouse does place one or both of its feet on the wedge part of the base/platform (1) portion, the base/platform (1) will tilt or pivot downward causing the release of the striker (2) without the mouse having to be near the bait (6) and while the mouse is anywhere on that part of the tilted or pivoted base/platform (from 3 to 7).

Figure 3:
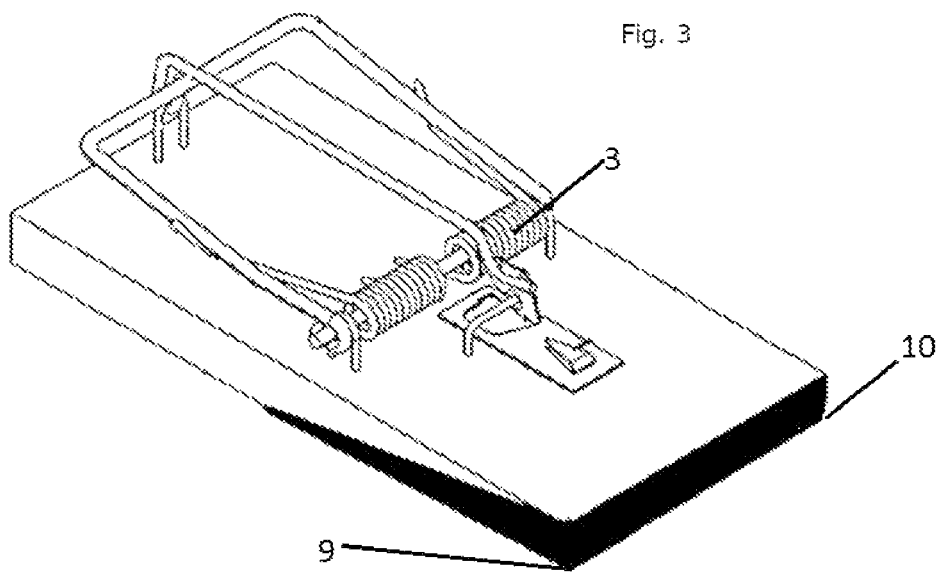
FIG. 3 is a perspective view of the side elevation view thereof showing the tapering (platform modified) in the armed position.

Referring to FIG. 3, the tapering will occur across the entire width of the base/platform (1), from one edge (9) to the other edge (10). It will be recognized that the tapering across the width of the platform will be the same from edge to edge (transversely), until the tapering reaches the end of the base/platform (1). In other words, the side view in FIG. 3 will be identical on the other side of the mousetrap.

As such, I have provided a new and improved mousetrap, which improves the likelihood of catching the mouse by making it more difficult for the mouse to steal the bait without springing the trap. The base, from the spring to the end of the platform, will tilt or pivot downward, thereby causing a chain reaction releasing the striker when the mouse steps upon any part of the tilted or pivoted base (the weight of the mouse's foot or feet causes the tilting).

The present improvement of this invention may be embodied in other specific forms without departing from the spirit or essential attributes thereof, and it is therefore desired that the present embodiment be considered in all respects as illustrative and not restrictive.

I claim:

1. A mousetrap comprising: a platform; a trigger; a catch; a latch; a striker; and a helical spring, wherein said helical spring is transversely located on a top surface of said platform near a mid-point of said platform and separates said platform into two sections, wherein said striker is held back by said latch to one section of said two sections of said platform, wherein the catch and the trigger are located on another section of said two sections of said platform, and wherein a portion of said platform from the helical spring through the catch and trigger to an end of the mousetrap represents a bait portion of said platform; wherein said platform is tapered from said helical spring through the end of the bait portion of the platform, wherein the tapering is upward and is a progressive gradual taper becoming smaller toward the end of said bait portion of said platform, wherein when a mouse steps on the platform the tapering causes the platform to vibrate, thus impacting a balance and stability of the platform creating a one-sided teetering motion improving triggering of the mousetrap.

2. The mousetrap of claim 1, further comprising wherein the bait portion of said platform that is tapered is about a same length as a portion of the platform that is not tapered, wherein when the mouse steps on the platform the platform vibrates impacting the balance and stability of the platform creating the one-sided teetering motion improving the triggering of the device.

3. The mousetrap of claim 1, further comprising wherein the tapering occurs on a bottom surface of said platform.

4. The mousetrap of claim 1, further comprising wherein the tapering of said bait portion of said platform extends transversely on said bait portion of said platform.

5. The mousetrap of claim 1, further comprising wherein said tapering creates an upward wedge from said helical spring to the end of the bait portion of said platform.

* * * * *